US011668324B2

(12) United States Patent
Merritt et al.

(10) Patent No.: US 11,668,324 B2
(45) Date of Patent: Jun. 6, 2023

(54) MOTOR AND BEARING COOLING PATHS AND A TRANSFER TUBE FOR ANOTHER COOLING CHANNEL

(71) Applicant: Hamilton Sundstrand Corporation, Charlotte, NC (US)

(72) Inventors: Brent J. Merritt, Southwick, MA (US); Craig M. Beers, Wethersfield, CT (US); John M. Beck, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 840 days.

(21) Appl. No.: 16/530,485

(22) Filed: Aug. 2, 2019

(65) Prior Publication Data

US 2021/0033111 A1 Feb. 4, 2021

(51) Int. Cl.
| | |
|---|---|
| *H02K 5/06* | (2006.01) |
| *F04D 29/58* | (2006.01) |
| *F04D 25/06* | (2006.01) |
| *F16C 37/00* | (2006.01) |
| *H02K 5/167* | (2006.01) |
| *H02K 5/20* | (2006.01) |
| *H02K 7/08* | (2006.01) |
| *H02K 9/10* | (2006.01) |

(52) U.S. Cl.
CPC ........... *F04D 29/584* (2013.01); *F04D 25/06* (2013.01); *F16C 37/00* (2013.01); *H02K 5/1672* (2013.01); *H02K 5/20* (2013.01); *H02K 7/083* (2013.01); *H02K 9/10* (2013.01); *F16C 2360/00* (2013.01); *H02K 2205/03* (2013.01)

(58) Field of Classification Search
CPC ............ H02K 9/00; H02K 9/005; H02K 9/02; H02K 9/08; H02K 9/10; H02K 5/20; H02K 5/1672; H02K 7/083; H02K 2205/03; F04D 29/584; F04D 25/06; F16C 37/00; F16C 2360/00
USPC ............. 310/52, 55, 57, 58, 63, 64; 417/369
See application file for complete search history.

(56) References Cited

U.S. PATENT DOCUMENTS

| | | | | |
|---|---|---|---|---|
| 3,321,654 A | * | 5/1967 | Allendorph | ............... H02K 5/04 310/216.136 |
| 5,250,863 A | * | 10/1993 | Brandt | .................. F04D 13/086 310/87 |
| 5,538,404 A | * | 7/1996 | DiFlora | ............... F04B 39/0033 181/403 |

(Continued)

FOREIGN PATENT DOCUMENTS

KR 101847165 4/2018

OTHER PUBLICATIONS

The Extended European Search Report for European Patent Application No. 19215038.1 dated Jul. 17, 2020.

*Primary Examiner* — Maged M Almawri
(74) *Attorney, Agent, or Firm* — Carlson, Gaskey & Olds, P.C.

(57) ABSTRACT

A compressor includes a rotor configured to compress air and driven by a shaft. A motor is drives the shaft. The first and second journal bearings facilitate rotation of the shaft. The first journal bearing is upstream from the motor and the second journal bearing is downstream from the motor. The transfer tube is configured to provide cooling air from a bearing cooling air inlet to the first journal bearing. A method for cooling a compressor is also disclosed.

15 Claims, 3 Drawing Sheets

(56) References Cited

U.S. PATENT DOCUMENTS

| | | | | |
|---|---|---|---|---|
| 5,630,461 A * | 5/1997 | CoChimin | | H02K 5/18 164/45 |
| 5,864,189 A * | 1/1999 | Kodaira | | H02K 7/06 310/43 |
| 6,102,672 A * | 8/2000 | Woollenweber | | F04D 25/06 417/370 |
| 7,014,418 B1 * | 3/2006 | Arnold | | F01D 5/048 415/206 |
| 7,342,332 B2 | 3/2008 | McAuliffe et al. | | |
| 7,575,421 B2 * | 8/2009 | McAuliffe | | F04D 25/06 417/370 |
| 7,633,193 B2 | 12/2009 | Masoudipour et al. | | |
| 8,459,966 B2 * | 6/2013 | Hipsky | | B64D 13/00 417/325 |
| 8,863,548 B2 * | 10/2014 | Hipsky | | F04D 25/06 62/505 |
| 8,901,791 B2 | 12/2014 | Saban et al. | | |
| 9,328,734 B2 * | 5/2016 | Colson | | F04D 25/024 |
| 9,685,835 B2 * | 6/2017 | Colson | | H02K 5/04 |
| 9,755,484 B2 * | 9/2017 | Pal | | H02K 1/32 |
| 10,808,723 B2 * | 10/2020 | Nagao | | F04D 29/056 |
| 11,143,204 B2 * | 10/2021 | Park | | F04D 25/024 |
| 11,339,800 B2 * | 5/2022 | Sakota | | F01D 17/141 |
| 2004/0012284 A1 | 1/2004 | Denton | | H02K 5/203 310/89 |
| 2004/0234373 A1 * | 11/2004 | Martin | | F01D 25/24 415/206 |
| 2006/0061221 A1 * | 3/2006 | McAuliffe | | F04D 29/057 310/58 |
| 2006/0061222 A1 * | 3/2006 | McAuliffe | | H02K 7/083 310/60 R |
| 2006/0073030 A1 * | 4/2006 | McAuliffe | | F04D 29/4213 417/366 |
| 2006/0181167 A1 * | 8/2006 | Bradfield | | H02K 5/10 310/239 |
| 2007/0018516 A1 * | 1/2007 | Pal | | F02C 7/12 310/58 |
| 2008/0141679 A1 * | 6/2008 | Behaghel | | F01D 5/081 60/806 |
| 2009/0028730 A1 * | 1/2009 | Radermacher | | H02K 7/14 415/177 |
| 2009/0056681 A1 * | 3/2009 | Shibui | | F02B 37/04 123/559.1 |
| 2011/0097222 A1 * | 4/2011 | Komatsu | | F04D 29/5853 417/366 |
| 2012/0011878 A1 * | 1/2012 | Hipsky | | B64D 13/06 62/401 |
| 2012/0014784 A1 * | 1/2012 | Hipsky | | F04D 29/5806 415/177 |
| 2012/0017617 A1 * | 1/2012 | Beers | | F04D 25/06 62/505 |
| 2012/0049668 A1 * | 3/2012 | Garriga | | H02K 9/12 310/59 |
| 2012/0051957 A1 * | 3/2012 | Beers | | F04D 29/057 29/898.07 |
| 2012/0064814 A1 * | 3/2012 | Beers | | F04D 25/082 454/71 |
| 2012/0064815 A1 * | 3/2012 | Beers | | F04D 29/057 454/71 |
| 2012/0242176 A1 * | 9/2012 | Pal | | H02K 1/20 310/43 |
| 2013/0097996 A1 * | 4/2013 | Rosen | | F04D 29/644 29/889.22 |
| 2014/0030070 A1 * | 1/2014 | Beers | | F04D 29/057 29/888.025 |
| 2014/0144412 A1 * | 5/2014 | An | | H02K 11/33 123/562 |
| 2014/0357176 A1 * | 12/2014 | Beers | | B64D 13/06 454/76 |
| 2015/0044075 A1 * | 2/2015 | Abe | | F04D 29/40 417/349 |
| 2015/0104301 A1 * | 4/2015 | Colson | | H02K 5/04 415/206 |
| 2015/0308456 A1 * | 10/2015 | Thompson | | F04D 29/5853 417/244 |
| 2016/0032931 A1 * | 2/2016 | Lee | | F04D 25/0606 417/368 |
| 2016/0186777 A1 * | 6/2016 | Colson | | F04D 29/4226 417/366 |
| 2017/0175748 A1 * | 6/2017 | Pal | | F04D 25/082 |
| 2017/0204874 A1 * | 7/2017 | Colson | | F04D 29/4206 |
| 2017/0211595 A1 * | 7/2017 | Bertoneri | | F04D 31/00 |
| 2019/0300197 A1 * | 10/2019 | Colson | | F04D 19/00 |
| 2021/0293253 A1 * | 9/2021 | Chavez Castellanos | | F04D 29/584 |
| 2022/0325722 A1 * | 10/2022 | Barnes | | F04D 29/584 |

* cited by examiner

MOTOR AND BEARING COOLING PATHS AND A TRANSFER TUBE FOR ANOTHER COOLING CHANNEL

BACKGROUND

This application relates to a compressor for an air machine.

Air machines include a turbine and a compressor. Partially compressed air is delivered to the compressor, and the compressor is driven to further compress this air. A motor drives the compressor. This compressed air is passed downstream to drive a turbine, with the turbine in turn helping to drive the compressor as the air expands across the turbine. This expanded air is then utilized for a downstream use, such as cabin air for an aircraft.

Air machines have a shaft which connects the compressor and the turbine. Bearings facilitate rotation of the shaft. Heat accumulates in the compressor as the air machine operates, and in particular, at the bearings and motor.

SUMMARY

A compressor according to an exemplary embodiment of this disclosure, among other possible things includes a rotor configured to compress air and driven by a shaft. A motor is drives the shaft. First and second journal bearings facilitate rotation of the shaft. The first journal bearing is upstream from the motor and the second journal bearing is downstream from the motor. A transfer tube is configured to provide cooling air from a bearing cooling air inlet to the second journal bearing.

In a further example of the foregoing, the cooling air travels in the same direction through the first journal bearing as a direction of airflow through the compressor.

In a further example of any of the foregoing, a thrust bearing is configured to facilitate rotation of the shaft. The thrust bearing is arranged downstream from the second journal bearing, and wherein the bearing cooling air inlet is in fluid communication with the thrust bearing.

In a further example of any of the foregoing, the thrust bearing includes a thrust shaft and a thrust plate, the thrust shaft including first and second orifices. The first and second orifices are in fluid communication with the bearing cooling air inlet.

In a further example of any of the foregoing, the second journal bearing is in fluid communication with the second orifice and the thrust bearing is in fluid communication with the first orifice.

In a further example of any of the foregoing, the compressor includes a passage between the motor and the shaft. The passage is in fluid communication with the bearing cooling air inlet via the first and second orifices.

In a further example of any of the foregoing, the bearing cooling stream includes first and second bearing cooling streams. The first bearing cooling stream passes through the first journal bearing and the second bearing cooling stream does not pass through the first journal bearing.

In a further example of any of the foregoing, a seal is immediately upstream from the first journal bearing and is configured to direct the second bearing cooling stream to the motor.

In a further example of any of the foregoing, the motor includes a motor rotor shaft. The motor rotor shaft includes an orifice upstream from the motor. The orifice is configured to communicate the cooling air to a cooling air outlet.

In a further example of any of the foregoing, a heat shield is upstream from the motor.

In a further example of any of the foregoing, the transfer tube is attached to a housing of the motor.

A method for cooling a compressor according to an exemplary embodiment of this disclosure, among other possible things includes providing a first cooling air stream to a thrust bearing and a first journal bearing. The thrust bearing and first journal bearings are configured to facilitate rotation of a shaft in a compressor. A second cooling air stream is provided to a second journal bearing such that that cooling air provided to the second journal bearing does not pass through the first journal bearing.

In a further example of the foregoing, the second cooling air stream is provided to the second journal bearing from a bearing cooling air inlet via a transfer tube.

In a further example of any of the foregoing, the second cooling air stream flows through the second journal bearing in the same direction as a direction of airflow through the compressor.

In a further example of any of the foregoing, the thrust bearing includes a thrust shaft and a thrust plate, the thrust shaft includes first and second orifices. The first cooling air stream flows through the orifices.

In a further example of any of the foregoing, the method provides the first cooling air stream to a motor which is configured to rotate the shaft.

In a further example of any of the foregoing, the method expels the first cooling air stream from the compressor after providing the first cooling air stream passes to the motor and expelling the second cooling air stream after providing the second cooling air stream to the second journal bearing.

DETAILED DESCRIPTION

Figure 1:
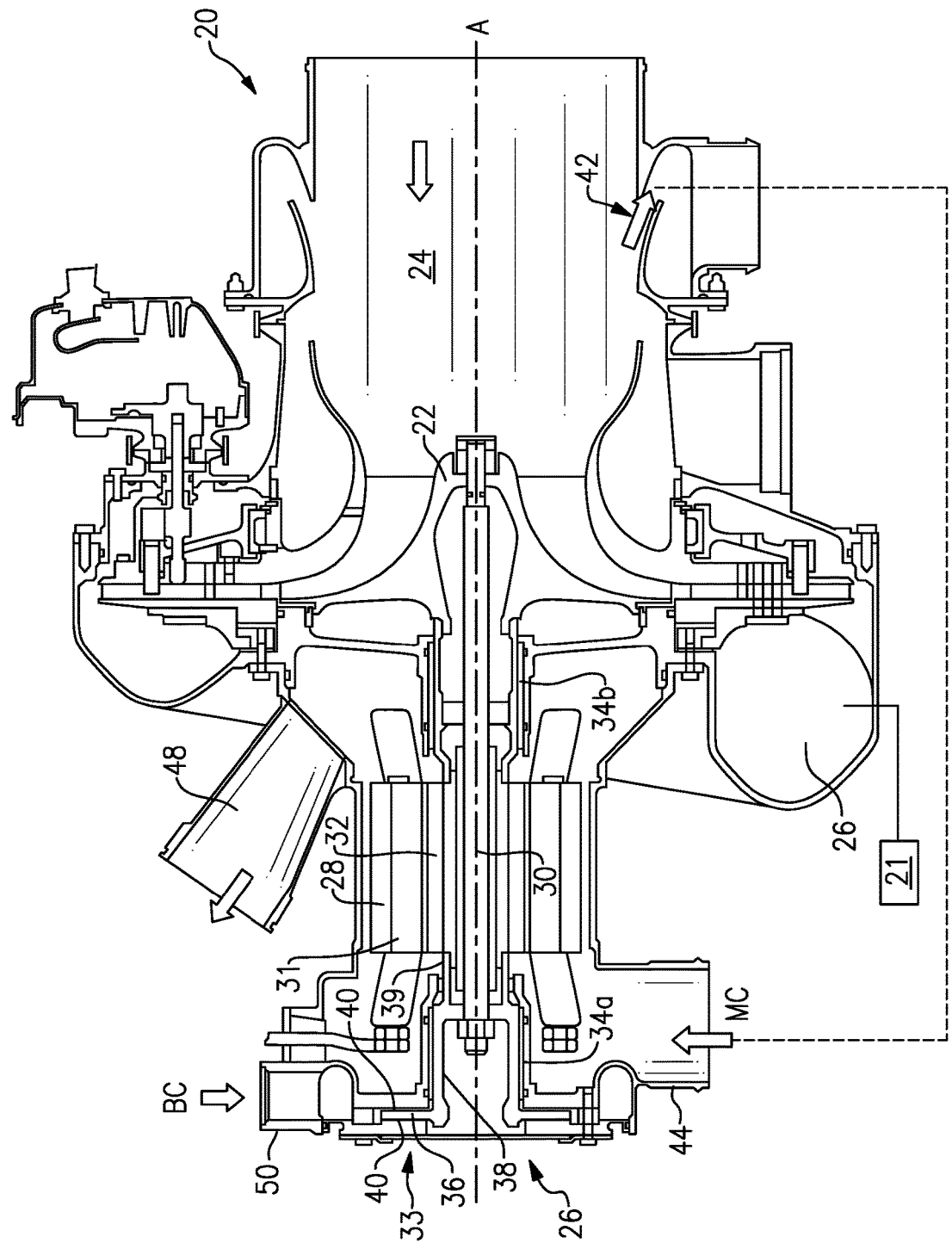
FIG. 1 shows a schematic cross-section of a compressor for an air machine.

FIG. 1 shows a compressor 20 that may be incorporated into a cabin air supply system 21 for supplying air to the cabin of an aircraft. A rotor 22 receives air to be compressed from an inlet 24, and compresses the air to a compressor outlet 26. A motor 28 drives a motor rotor shaft 39 and driveshaft 30 and to rotate the rotor 22. The motor 28 is an electric motor and includes a rotor 31 and a stator 32, as would be known in the art. In FIG. 1, air flows through the compressor from right to left.

A thrust bearing 33 and a journal bearings 34a, 34b facilitate rotation of the driveshaft 30. The thrust bearing 33 includes a thrust bearing disk 36 which is associated with a thrust shaft 38. The thrust shaft 38 connects to the motor rotor shaft 39. The thrust bearing disk 36 has thrust bearing surfaces 40.

Figure 2:
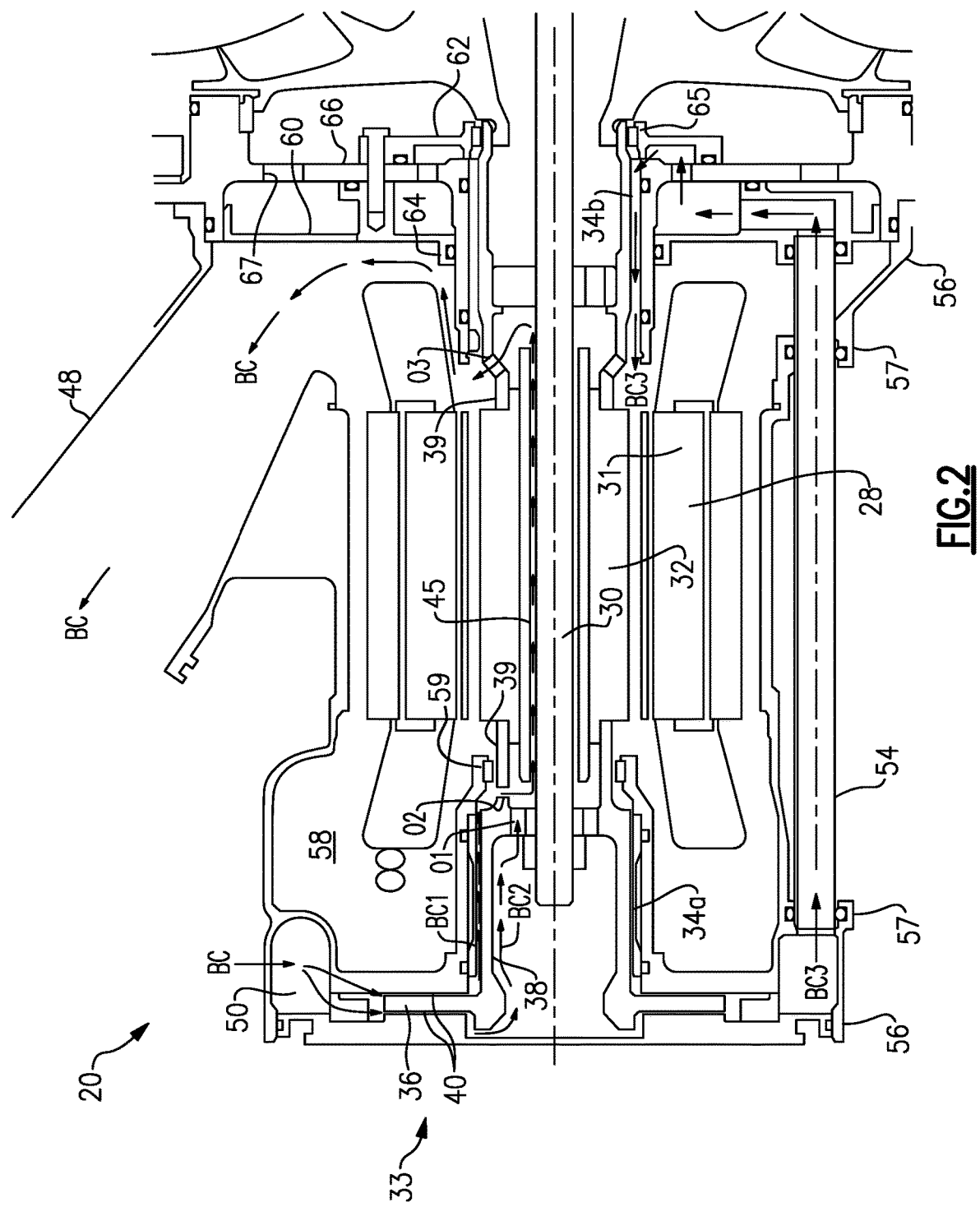
FIG. 2 shows a detail view the cross-section of FIG. 1.
Figure 3:
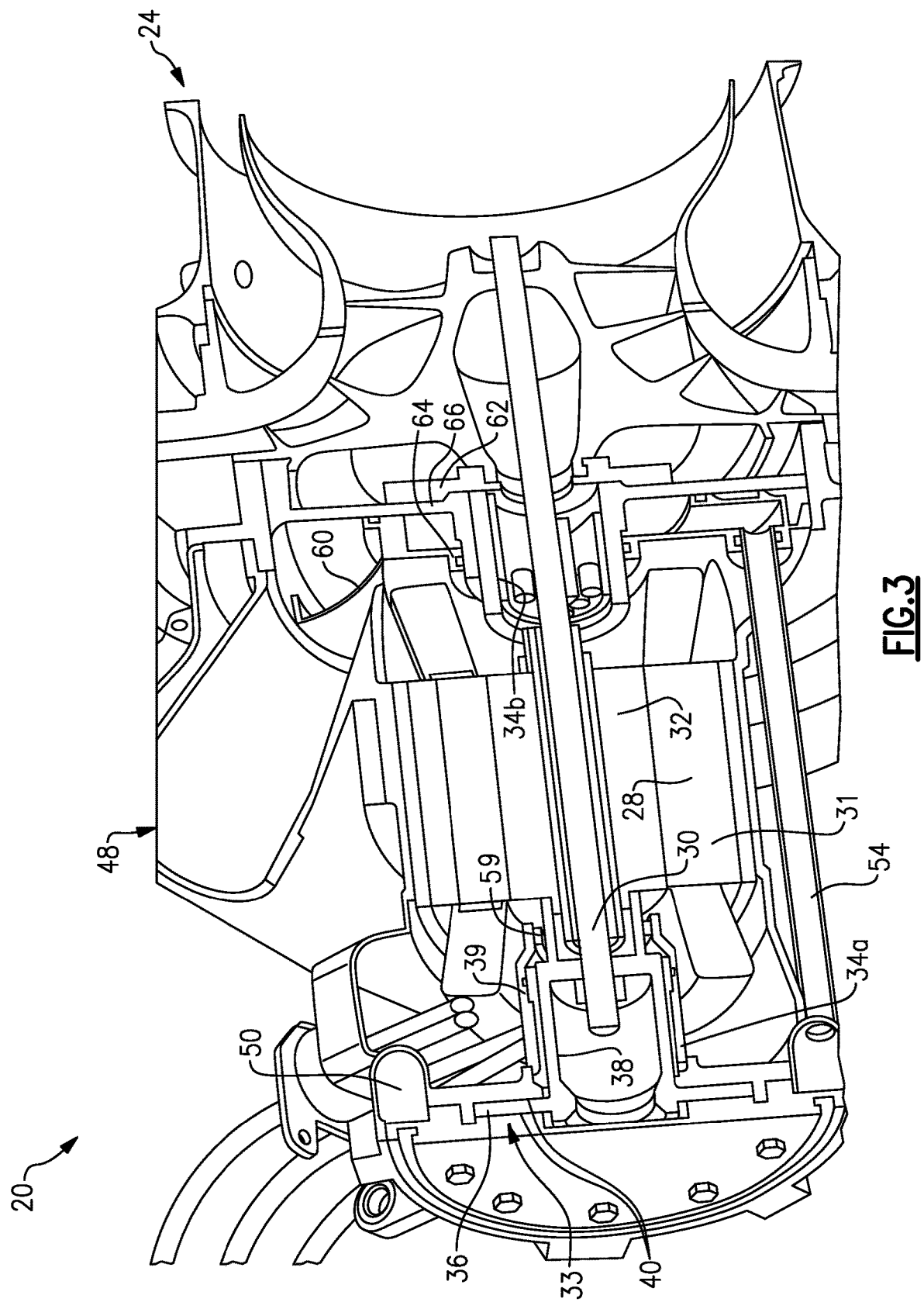
FIG. 3 shows an isometric view of the compressor of FIG. 1.

The motor 28, the thrust bearing 33, and the journal bearings 34a, 34b are cooled with cooling air. FIG. 2 schematically shows a detail view of the motor 28 and bearing 33, 34a, 34b. FIG. 3 shows an isometric view of the compressor of FIG. 1.

A motor cooling stream MC is drawn from the compressor inlet 20 at 42 and provided to a motor cooling inlet 44. The motor cooling stream MC ultimately exits the compressor 20 via a cooing air outlet 48. In one example, the outlet 48 ducts to ram (e.g., ambient) air. A bearing cooling stream BC is drawn from downstream of the compressor outlet 26 and provided to a bearing cooling inlet 50. In one example, a heat exchanger (not shown) is upstream from the bearing cooling inlet 50 and downstream from the compressor outlet 26, and cools air in the bearing cooling stream BC.

The bearing cooling stream BC cools the thrust bearing 33 and the journal bearings 34a, 34b, and provides cooling to the motor 28, will be explained in more detail below.

The bearing cooling stream BC is split into two bearing cooling streams BC1 and BC2, which pass along either side of the thrust bearing disk 36 at thrust surfaces 40 to cool the thrust bearing 33. The bearing cooling streams BC1 and BC2 continue along either side of the thrust shaft 38.

Orifices O1 and O2 are formed in the thrust shaft 38. The orifice O1 is oriented generally parallel to an axis A of the shaft 30 while the orifice O2 is oriented generally perpendicular to an axis A of the shaft 30. That is, the orifices O1, O2 are oriented generally perpendicular to one another. The first bearing cooling stream B1 passes through the journal bearing 34a and then through the orifice O2. The second bearing cooling stream BC2 passes through the orifice O1. The first bearing cooling stream BC1 then joins the second bearing cooling stream BC2 and both streams pass along the inside diameter of the motor 28, via a passage 45 adjacent the driveshaft 30, providing cooling to the motor 28 and/or driveshaft 30. The bearing cooling stream BC then passes through an orifice O3 formed in the motor rotor shaft 39 upstream of the motor 28, and exits the compressor 20 via a cooling air outlet 48. In one example, the outlet 48 ducts to ram (e.g., ambient) air.

A third bearing cooling stream BC3 is also provided from the bearing cooling air inlet 50 to a transfer tube 54. The transfer tube 54 communicates the bearing cooling stream BC3 to the journal bearing 34b. The transfer tube 54 is attached to a housing 56 of the motor 28 via bosses 57.

Bearing cooling stream BC3 is provided to the journal bearing 34b via an opening 35 in a bearing support 66 (discussed more below) and passes through the journal bearing 34b in the same direction as the direction of airflow through the compressor 20. The third bearing cooling stream BC3 does not pass through the thrust bearing 33 or journal bearing 34a. Accordingly, the third bearing cooling stream BC3 is relatively cool compared to the first and second bearing cooling streams BC1, BC2 at the orifice O3. Therefore, the third bearing cooling stream BC3 provides improved cooling to the journal bearing 34a as compared to a cooling stream that has passed through the thrust bearing 33 and/or journal bearing 34a, or another compressor 20 component. The third bearing cooling stream BC3 exits the compressor 20 via cooling air outlet 48.

A seal 59, such as a labyrinth seal (though other types of seals are contemplated), is arranged immediately upstream from the journal bearing 34a and downstream from the motor 28. The seal 59 prevents the first bearing cooling stream BC1 from entering a cavity 58 between the thrust bearing 33 and the motor 28. Thus, the first bearing cooling stream BC1 is directed into the orifice O2 and then into the motor 28 (as discussed above) by the seal 59. Air in the cavity 58 therefore stays cool relative to the temperature of air in the first bearing cooling stream BC1, and provides thermal insulation for the motor 28 and other compressor 20 components from the relatively hot first bearing cooling stream BC1. Additionally, the seal 59 prevents loss of pressure in the first bearing cooling stream BC1 as it travels through journal bearing 34a. In other words, the pressure drop of the first bearing cooling stream BC1 across the journal bearing 34a is relatively low. This improves the lifetime and reliability of the journal bearing 34a.

A heat shield 60 and seal plate 62 are provided upstream from the motor 28 and adjacent the journal bearing 34b. The seal plate 62 includes a seal 64 such as a vespel seal or o-seal, though other types of seals are contemplated. In one example, seal 64 is a static o-seal. Seal 64 prevents high-pressure air in the third bearing cooling stream BC3 from leaking into the outlet 48 prior to entering the journal bearing 34b. In other words, the seal 64 helps direct bearing cooling stream BC3 into the journal bearing 34b. The seal plate 62 also includes a seal 65 such as a labyrinth seal (though other types of seals are contemplated) immediately downstream from the journal bearing 34b. As with the seal 59 adjacent the journal bearing 34a, the seals 64, 65 adjacent the journal bearing 34b maintain pressure in the journal bearing 34b to minimize pressure drop across the journal bearing 34b, which improves the lifetime and reliability of the journal bearing 34b.

The heat shield 60 and seal 64 are downstream from a bearing support 66, while the seal plate 62 and seal 65 are upstream of the bearing support 66. The bearing support in this example supports the journal bearing 34b. In some examples, the bearing support 66 includes an opening 67 through which hot, high pressure air within the compressor can flow towards the outlet 48. The heat shield 60 thermally insulates the motor 28 (and in particular, the motor stator 31) and journal bearing 34b from the hot air.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A compressor comprising:
a rotor driven by a shaft and configured to compress air;
a motor for driving the shaft;
first and second journal bearings for facilitating rotation of the shaft, wherein the first journal bearing is upstream from the motor and the second journal bearing is downstream from the motor; and
a transfer tube, the transfer tube configured to provide cooling air from a bearing cooling air inlet to the first journal bearing such that cooling air from the transfer tube does not pass through the second journal bearing, wherein the bearing cooling air inlet provides a bearing cooling stream that comprises first and second bearing cooling streams, and wherein the first bearing cooling stream passes through the first journal bearing and the second bearing cooling stream does not pass through the first journal bearing.

2. The compressor of claim 1, further comprising a seal immediately upstream from the second journal bearing and configured to direct the second bearing cooling stream to the motor.

3. The compressor of claim 1, wherein the motor includes a motor rotor shaft, the motor rotor shaft includes an orifice upstream from the motor, and wherein the orifice is configured to communicate the cooling air to a cooling air outlet.

4. The compressor of claim 1, further comprising a heat shield upstream from the motor.

5. The compressor of claim 1, wherein the transfer tube is attached to a housing of the motor.

6. The compressor of claim 1, wherein the cooling air travels in the same direction through the first journal bearing as a direction of airflow through the compressor.

7. The compressor of claim 1, further comprising a thrust bearing configured to facilitate rotation of the shaft, the thrust bearing arranged downstream from the second journal bearing, and wherein the bearing cooling air inlet is in fluid communication with the thrust bearing.

8. The compressor of claim 7, wherein the thrust bearing includes a thrust shaft and a thrust plate, the thrust shaft including first and second orifices, wherein the first and second orifices are in fluid communication with the bearing cooling air inlet.

9. The compressor of claim 8, wherein the second journal bearing is in fluid communication with the second orifice and wherein the thrust bearing is in fluid communication with the first orifice.

10. The compressor of claim 8, further comprising a passage between the motor and the shaft, wherein the passage is in fluid communication with the bearing cooling air inlet via the first and second orifices.

11. A method for cooling a compressor, comprising:
providing a first cooling air stream from a bearing cooling air inlet to a thrust bearing and a first journal bearing, the thrust bearing and first journal bearing configured to facilitate rotation of a shaft in a compressor; and
providing a second cooling air stream from the bearing cooling air inlet to a second journal bearing such that cooling air provided to the second journal bearing does not pass through the first journal bearing, wherein the second cooling air stream is provided to the second journal bearing from the bearing cooling air inlet via a transfer tube such that cooling air from the transfer tube does not pass through the first journal bearing.

12. The method of claim 11, wherein the thrust bearing includes a thrust shaft and a thrust plate, the thrust shaft including first and second orifices, and wherein the first cooling air stream flows through the orifices.

13. The method of claim 11, wherein the second cooling air stream flows through the second journal bearing in the same direction as a direction of airflow through the compressor.

14. The method of claim 11, further comprising providing the first cooling air stream to a motor configured to rotate the shaft.

15. The method of claim 14, further comprising expelling the first cooling air stream from the compressor after providing the first cooling air stream passes to the motor and expelling the second cooling air stream after providing the second cooling air stream to the second journal bearing.

* * * * *